(12) United States Patent
Cartwright et al.

(10) Patent No.: US 6,476,718 B1
(45) Date of Patent: Nov. 5, 2002

(54) TRACEABLE LUGGAGE BAG AND SYSTEM

(76) Inventors: Christopher Leslie Mutlow Cartwright, 241 Laurel Pl., San Rafael, CA (US) 94901; John Mutlow Cartwright, 111 Sunnyside Ave., Sonoma, CA (US) 95476

( * ) Notice: Subject to any disclaimer, the term of this patent is extended or adjusted under 35 U.S.C. 154(b) by 13 days.

(21) Appl. No.: 09/591,932

(22) Filed: Jun. 12, 2000

(51) Int. Cl.[7] .............................................. G08B 13/14
(52) U.S. Cl. ............................ 340/572.1; 340/572.4; 340/572.7; 340/568.1; 340/825.31
(58) Field of Search .................. 340/572, 572.7, 340/572.1, 568.1, 825.31, 572.4

(56) References Cited

U.S. PATENT DOCUMENTS

| | | | | |
|---|---|---|---|---|
| 5,041,826 A | * | 8/1991 | Milheiser | 340/825.54 |
| 5,682,143 A | * | 10/1997 | Brady et al. | 340/572 |
| 6,002,344 A | * | 12/1999 | Bandy et al. | 340/825.54 |
| 6,025,780 A | * | 2/2000 | Bowers et al. | 340/572.3 |
| 6,100,804 A | * | 8/2000 | Brady et al. | 340/572.7 |
| 6,107,920 A | * | 8/2000 | Eberhardt et al. | 340/572.7 |

* cited by examiner

*Primary Examiner*—Jeffery Hofsass
*Assistant Examiner*—Hung Nguyen
(74) *Attorney, Agent, or Firm*—Risto A. Rinne, Jr.

(57) ABSTRACT

An apparatus for the unique and permanent identification of an article of luggage includes a microchip attached to the article of luggage. The microchip contains a unique identification number that uniquely identifies that particular article of luggage apart from all other articles of luggage. A data base is provided that includes a file appertaining to each article of luggage. The file includes the name and address of the owner of the article of luggage and is updated by the owner, as desired, to include his travel plans. Only the owner (or his representative) may change the contents of the file. Authorized users, such as airline companies, may view but not alter the contents of the file subsequent to a communication to the data base that includes the unique identification number and an authorized user identification number.

14 Claims, 1 Drawing Sheet

TRACEABLE LUGGAGE BAG AND SYSTEM

BACKGROUND OF THE INVENTION

1. Field of the Invention

The present invention, in general relates to luggage and, more particularly, to devices and systems that are adapted for use with automated baggage handling systems and which are of use in identifying and locating the rightful owner of an article of luggage.

When traveling, luggage is too often either lost or delayed. While this may occur whenever an owner is separated from his luggage it is an especially troublesome situation when traveling by airplane. As such, airlines attach tags and/or labels to pieces of luggage to aid in identifying the owner and the ultimate intended destination of the luggage.

For example, some airlines attach a bar coded label to a suitable location, such as to a handle of an article of luggage during "check-in". Data is entered at that time into a computer system of the airline as to the destination of the owner and therefore also the destination of the luggage including the intended flights that the owner and the luggage are to take.

Then, as the luggage is mechanically conveyed into the baggage (i.e., luggage) handling areas of the airport, bar code scanners will periodically scan the bar code labels, perform a "look-up" accessing the data base of the airline's computer system and then direct the luggage via a system of various conveyors and baggage transport personnel to its intended flight of departure (or upon arriving to the appropriate location for retrieval) where it is loaded as cargo. These types of systems are generally referred to as "automated baggage (or luggage) handling systems".

While these types of systems often works well, they do include, and therefore suffer from, certain disadvantages.

For one thing, when an article of luggage (i.e., a suitcase or a garment bag) is misplaced, it likely will not depart on its intended flight. Even worse, it can depart on a flight that is traveling to an errant location, possibly taking the luggage even further away from its intended destination.

There is no way to predict how soon each and every error that results in misplacing or misdirecting an article of luggage can be corrected. In some cases the articles of luggage are lost for days. Sometimes, they are never found and sometimes, when found, they can never be reunited with their proper owners.

For example, if a person is traveling on business and the nature of his business requires that he travel to many locations, he may only be intending to stay at any particular location for a day or two or perhaps for only a fraction of a day.

A several day delay in locating that person's luggage can be severe as is described in greater detail hereinafter.

The person can leave the hotel or location of a business meeting, for example, where he said he would be staying at well before the luggage is recovered and can be delivered to that hotel or location. There is risk that as he travels to other locations, the logistics involved will simply prevent his lost luggage from ever being returned to him. This is because it may never catch up to him as he travels from location to location.

Hopefully, there will be an address label affixed to the luggage that identifies the permanent residence of the owner so that eventually, it can be delivered to him. Still, this is of no avail to the traveler who is separated from his luggage while he travels.

No matter how well intended is the attempt to return his luggage, it simply may not possible to anticipate many days in advance where the person will be at some time in the future. If the person is staying only briefly at each location and is traveling from location to location or if his travel plans are volatile and subject to change at any moment, the mere act of trying to convey a lost piece of luggage to that person may well result in sending it to where he was and never to where he is.

Eventually, the process will be aborted because it simply becomes excessively cost prohibitive and the luggage and all of its contents will not be reunited with its proper owner, at least not while he is traveling and perhaps, never. Recompense will be made in accordance with agreements and the liability of the carrier, in this example the airline.

Accordingly, there will be considerable added expense that is incurred by the airline as it attempts to locate and then deliver the lost article to its owner. Add to this the fact that there will be an added expense, perhaps substantial, when a final financial settlement for damages is made if the luggage is not returned in due course of time and the owner is forced to replace the contents (as may well occur while traveling).

Add to that also the inconvenience and emotional upset that is experienced by the owner and it is obvious that everyone loses in this instance. The owner may experience ill feelings and simply not wish to travel by that particular carrier again.

This rather common type of a reaction in response to an airline having lost their luggage is likely to add further cost to the airline because it will experience a loss in future revenues because that person will simply avoid using that airline in the future.

Other disadvantages are associated with mechanically having to produce an additional identifying tag or label and of having to affix the tag or label to the luggage.

This increases the time that is required for "check-in", a problem that is all too well known by air travelers. It also adds expense to the airline in that they must first produce the tag or label (for example, the bar coded label) and then affix it properly to the article of luggage. This is a significant issue to the airlines and it is discussed in greater detail hereinafter.

By attaching the tag or the label to the luggage, it is generally assumed that the airline incurs an added liability to the extent that the tag or label that is applied by them should be affixed properly and that it should therefore remain attached to the luggage throughout its useful life, which typically includes one or more airline flights from a particular departure location until it reaches a particular destination location at which time it is to be reclaimed by the owner. Once reclaimed, it will have served its purpose.

Therefore, if the tag or label should be torn or if it should happen to fall off, the airline may be held liable for not properly affixing it to the luggage in the first place.

Any tag or label that an airline may attach is of necessity temporary. Previously, a string or an elastic strap was commonly used to secure the tag or label to the luggage by passing the string or strap through a loop or through a handle that is attached to and a part of the luggage.

While either of these methods may still be used on occasion, a more common current way to secure the label (i.e., the bar coded label) to the luggage is by passing the label through the luggage handle and securing a first end of the label to a remaining end by the use of an adhesive, thereby forming a loop around the handle.

The object, as mentioned hereinabove, is that the tag or label should remain affixed to the article of luggage until it is reclaimed by the owner. At that time it must be readily removable by the owner.

It would obviously become untenable if each tag or label were attached in such a manner so as to render it difficult, if not impossible, for the owner to remove. Not only would a plurality of "left-over" tags and labels look unsightly, but they would tend to increase the potential that confusion and a "miss-reading" of the current tag or label might occur on some subsequent flight.

Therefore, there is an inevitable contradiction of needs. On the one hand a tag or label that is durable is needed while on the other one that is also easily and readily removable is needed. Both needs, as they relate to a temporary label, cannot be simultaneously optimally satisfied. Compromise is required.

These problems, though discussed primarily for air travel, relate to all modalities of travel. Luggage may be lost by any carrier or by any responsible person at any time. It does not matter who the responsible party is, whether it is the carrier or the owner directly. The above described problems remain unsolved whenever an article of luggage is separated from its owner.

These types of problems relate to all types of luggage and the invention, as described in greater detail hereinafter, relates to all types of luggage as well. Some of the more common types of luggage include suitcases, garment bags, trunks, carry-on bags, soft-sided luggage, hard-sided luggage, and other specially types of cases, for example gun cases.

When the term "luggage" or "luggage bag" or any similar term is used in this specification, it is intended to refer to any and to all of these various types and forms of luggage.

There are other luggage-related issues, aside from the return of lost luggage items, that cause problems for the airlines and possibly for certain other carriers as well. As was briefly discussed hereinabove, the printing of the bar code label (sometimes known as a "bag tag") for each article of luggage that is "checked in" is expensive and, as already mentioned, time consuming.

Both the material (i.e., label stock) to print the adhesive bar code labels, the cost to purchase and maintain the label printers, entering this information into a data base, and the time necessary to print the labels and to attach them to the various articles of luggage increase the costs that must be born by every air traveler. Each time a person elects to travel by air, a portion of the expense in doing so must cover these costs.

Yet it is absolutely necessary that any solution intended to address these problems and to reduce the expense of baggage handling for the airlines must be adapted for use with automated baggage handling systems. An increasing number of airlines at an increasing number of airports are relying upon automated baggage handling systems (such as those that utilize bar code reading systems) along with automated conveyor systems and the like that read the labels and automatically route the luggage to the proper airline (i.e., airplane) upon departure and, on occasion, to the proper baggage claim area upon return.

Any solution must therefore be adaptable to integrate with automated luggage handling systems. If the solution is an asset to automated luggage handling systems and if it saved the airlines from having to print bar code labels and affix them to the luggage items, that would be of great benefit and value to the airline industry as well as to other types of carriers.

Accordingly there exists today a need for a traceable luggage bag and system to aid in the conveyance of a luggage bag and which is also useful in reuniting that article of luggage with its owner should it happen to be lost or delayed.

Clearly, such a device and system would be especially useful and desirable.

2. Description of Prior Art

Improvements relating to luggage are, in general, known. For example, the following patents describe various types of these devices:

U.S. Pat. No. 4,634,849 to Klingen, Jan. 6, 1987;
U.S. Pat. No. 4,707,592 to Ware, Nov. 17, 1987;
U.S. Pat. No. 5,051,55 to Wolfram, Sep. 24, 1991;
U.S. Pat. No. 5,646,592 to Tuttle, Jul. 8, 1997;
U.S. Pat. No. 5,866,888 to Bravman et al., Feb. 2, 1999;
U.S. Pat. No. 5,870,711 to Huffman, Feb. 9, 1999; and
U.S. Pat. No. 5,920,053 to DeBrouse, Jul. 6, 1999.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a traceable luggage bag and system that includes an article of luggage with means for providing a permanent identification that is attached thereto.

It is also an important object of the invention to provide a traceable luggage bag and system that includes an article of luggage with a unique bar code identification that is permanently attached thereto.

Another object of the invention is to provide a traceable luggage bag and system that includes an article of luggage with a unique identifying microchip that is permanently attached thereto.

Still another object of the invention is to provide a traceable luggage bag and system that includes an article of luggage with a plurality of permanent identifiers, such as a plurality of microchips or bar code labels that are each permanently attached thereto.

Still yet another object of the invention is to provide a traceable luggage bag and system that includes a data base of information regarding the owner of an article of luggage and which is accessible by authorized users to trace both ownership of the luggage and the location of the owner at any given time including the present, past, or where it is anticipated the owner will be in the future.

Yet another important object of the invention is to provide a traceable luggage bag and system that provides a permanent identifier attached to an article of luggage that provides a linkage, via a data base, with the owner of that article of luggage.

Still yet another important object of the invention is to provide a traceable luggage bag and system that includes a permanent identification that is attached by the manufacturer to an article of luggage.

One still further object of the invention is to provide a traceable luggage bag and system that includes a unique identification number permanently attached to a luggage bag that can be used for the normal routing of the luggage, such as by an airline.

One still further important object of the invention is to provide a traceable luggage bag and system that is able to correlate travel itinerary plans with a unique identification number that is permanently attached to the luggage bag.

One still further especially important object of the invention is to provide a traceable luggage bag and system that includes a unique identification number permanently attached to a luggage bag that is adaptable for use with automated baggage handling systems that are used by airlines at airports to route (i.e., convey) the luggage bag where desired.

One further especially useful object of the invention is to provide a traceable luggage bag and system that includes a unique identification number permanently attached to a luggage bag that provides automated identification (i.e., correlation) of a traveler with the luggage bag and is adaptable for use with the tracking and control systems of automated baggage handling systems of an airline.

Briefly, a traceable luggage bag and system that is constructed in accordance with the principles of the present invention has a permanent and unique identification number (i.e., an "ID") attached to at least one location of an article of luggage by the manufacturer. The identification number may be of any format as desired such as a bar code or an embedded microchip. A data base is maintained which uses the identification number to locate a "file" that relates to the owner. The owner updates the file by placing a telephone call to the data base regarding his future travel plans. This can be done via a modem and a direct telephone call to the data base (either automated or speaking directly to a data base representative) or over the Internet. The information supplied may include the name, telephone, and address of the hotel(s) the owner will be staying at, the dates he will be there, when he will be leaving and other locations and dates that indicate where he will be at and when he will be there. This information can be updated by the owner at any time, for example, should travel plans change. Any other relevant information, such as an alternate contact can also be supplied and maintained in the owner's file for that article of luggage (i.e., in the data base). This information can be provided by the owner or by his representative, for example, by his travel agent. An authorized user, such as an airline, scans the permanent unique identification number at check-in. There is no need for them to affix another tag or label to the luggage bag. The authorized user then periodically scans the unique identification number and relies upon that to make internal routing decisions, for example, to determine to which airplane the luggage should be directed. If, for any reason the luggage bag should be lost or delayed, in an attempt to locate the present whereabouts of the owner, the authorized user can access the data base to determine the present and anticipated future location of the owner and, using that information, can arrange for the most advantageous conveyance possible of the luggage bag back to its owner in a timely manner. Appropriate passwords (i.e., PINs) are assigned to the owner and to the authorized users to permit access to the data base file. The authorized user may, for example, be permitted to access the file of the owner subsequent to entering the proper PIN but the user would not be permitted to make any changes to the file. Only the owner (or his representative) may change information in the file, such as where the owner will be and for how long.

DETAILED DESCRIPTION OF THE INVENTION

Figure 1:
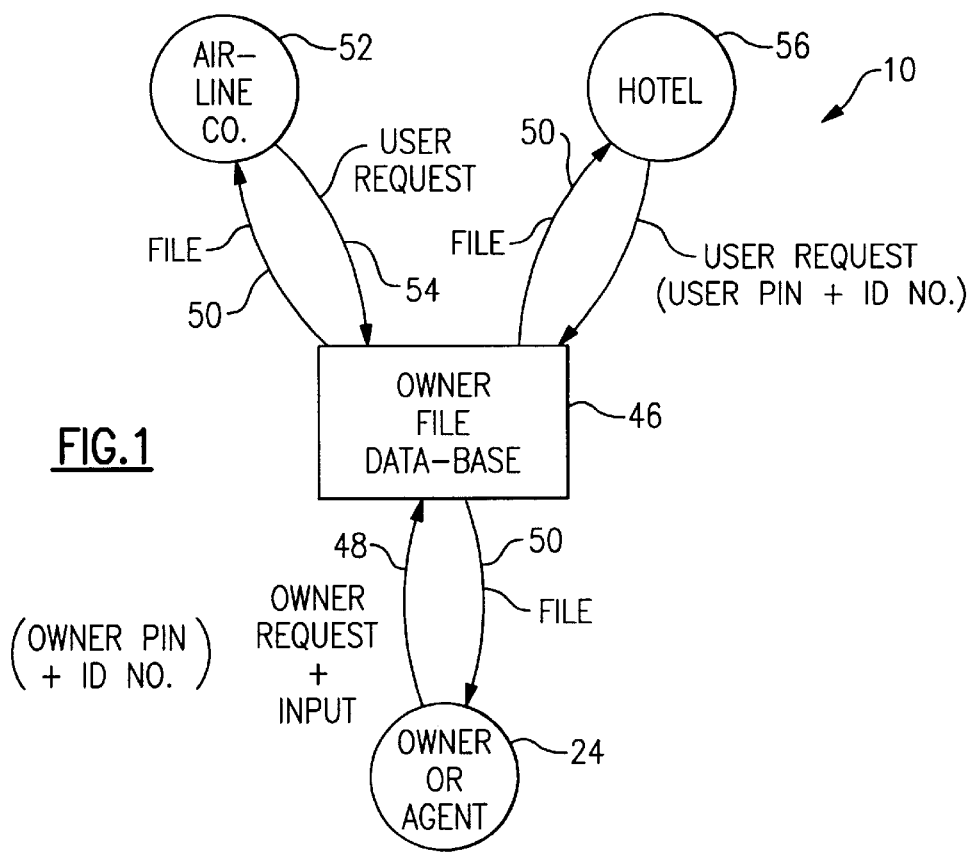
FIG. 1 is a block diagrammatic view of a traceable luggage bag and system showing the creation of a data base file by the owner of a luggage item and access to the data base file by various authorized users.
Figure 2:
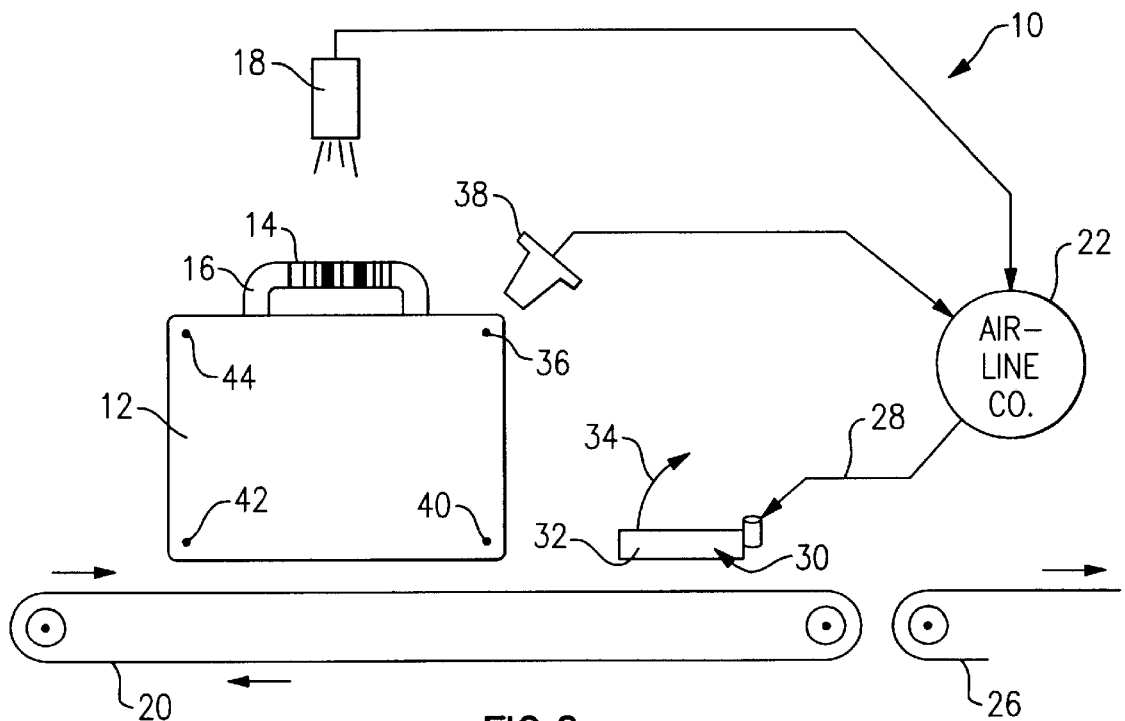
FIG. 2 is a block diagrammatic view of a traceable luggage bag and system showing use of a permanent identification number by an airline for the normal routing of a luggage item.

Referring to FIG. 1 and FIG. 2 is shown, each in part, a traceable luggage bag and system, identified in general by the reference numeral 10.

Referring first in particular to FIG. 2, a luggage bag 12 includes a permanent bar code label 14 affixed thereto. The bar code label 14 is shown as an integral part of a handle 16, although it could be attached anywhere on an exterior (i.e., a visible) portion of the bag 12.

A plurality of additional duplicate bar code labels (not shown) may be attached where desired. For example, if desired one each of the additional duplicate bar code labels may be attached to each of the six exterior sides to aid in scanning.

The bar code label 14 is unique to each article of luggage. The bar code symbology that is selected is up to the industry to decide as well as is the selection or creation of the organization that will assign the bar code numbers to the various manufacturers.

For example, the Uniform Code Council (UCC) may be the appropriate body to assist in any of these endeavors. The "Serial Shipping Container Code" is but one example of an essentially non-repeating bar code (within all reasonable limits of quantity and time) that the UCC administers. This particular bar code is a subset of the Code 128 symbology, and is well known in the bar code arts. A variation of this bar code and symbology may be appropriate or an entirely different bar code symbology may be required for this purpose.

A bar code scanner 18 scans the bar code label 14 as the bag 12 passes along a first conveyor 20. The first conveyor 20 is assumed to belong to an airline company. A host computer 22 of the airline company receives a unique identification number (from the bar code scanner 18) that the bar code label 14 contains.

Depending upon the level of sophistication of the airline or airport, the first conveyor 20 may or may not be present. If a manual approach is relied upon all that is required is that the bar code label 14 be scanned as appropriate by the airline to aid in properly routing the bag 12.

The bar code label 14 is installed into luggage or is otherwise affixed to the bag 12 by any method that is preferred. It may include a protective covering such as a mylar film or it may not.

What is important is that the bar code label 14 is attached during manufacture of the bag 12 and that it is both permanent and that the number it contains be unique to that particular piece of luggage (i.e., the bag 12). Any other bag (not shown) even though built by the same manufacturer and otherwise identical in every way would have a different number (i.e., a different bar code label [not shown]) that would encode a different and also a unique identification number.

The establishment of a numbering system (with numerals and/or alpha characters), as described herinabove, is selectable in accordance with the wishes of the luggage manufacturers, the airline industry, and any other trade organization(s) and group(s) as may be appropriate.

The size of the bar code label 14 (physically as well as the number of alpha and/or numeric characters) and the requirements appertaining to its location are all variables that the various involved industries can eventually reconcile and, hopefully, agree upon.

The unique identification number the bar code label 14 contains is used when the bag 12 is purchased by an owner 24 (FIG. 1). The owner registers his purchase of the bag 12 by any of a number of ways, as are described in greater detail hereinafter.

When the owner 24 checks in at a ticket counter (not shown) or at a curbside drop off point or at a remote check-in location, the bar code label 14 or the microchip such as 44 of the particular piece if luggage is scanned and is electronically associated (i.e., linked) with the owner who will be traveling to a destination. The piece of luggage's unique code will then be entered into the airline's Passenger Name Record (PNR) and will be associated with the passenger for the duration of that particular journey.

The host computer 22 uses the unique identification number to route the bag 12, as necessary. For example, if it is required to permit the bag 12 to pass on from the first conveyor 20 to a second conveyor 26, that is permitted to occur. This is done because, presumably, the second conveyor 26 will transport the bag 12 to the intended flight.

As the bag 12 goes through automated or non-automated baggage sort and handling systems, it may at times still need to be hand-sorted or delivered manually by personnel. In such cases personnel can use handheld scanning devices to access baggage routing and flight information.

If, however, the bag 12 is to be routed elsewhere, the host computer 22 sends a first signal 28 to a diverter mechanism 30. The first signal 28 actuates the diverter mechanism 30 so that a flapper 32 moves in the direction of a first arrow 34 at the appropriate time to divert the bag 12 away from the second conveyor 26.

Accordingly, it has been shown how the bar code label 14 that is permanently attached to the bag 12 is useful to route the bag 12 through automated baggage sort and handling systems as is desired by the airline. Of course, the airline need not make avail of this feature in order to benefit from the traceable luggage bag and system 10.

It is understood that while the airline is used as an example, any type of an alternate carrier (not shown) or handler (not shown) of the bag 12 would find similar benefit to the traceable luggage bag and system 10 as an aid in routing the bag 12 where desired and in reuniting a lost bag with its owner, as is described in greater detail hereinafter.

The permanent bar code label 14 saves the airline (or the carrier or the handler) from having to attach a tag (not shown) or an industry generated label/bar code (not shown) of their own. Below the bar code shall always be the alphanumeric code for easy viewing in the event of a scanning device failure when the bag number needs to be manually entered into a system.

Furthermore, because the bar code label 14 is permanent there is little if any danger that it can be lost. And if it were to somehow fall off of the bag 12, the redundancy of the bar code and microchips would maintain the bags ability to be identified. Even if a traceable baggage bar code label 14 were to be removed or somehow lost from a bag with only one bar code label or microchip, the liability might not fall on the airline, for they did not initially install it.

A first microchip 36 is optionally embedded within the bag 12 during manufacture. The first microchip 36 is a well known type of component capable of communicating with a microchip scanner 38 when in proximity thereof.

The first microchip 36 also contains and expresses to the microchip scanner 38 a unique permanent identification number that is the same as the unique identification number of the bar code label 14.

The first microchip 36 may be used along with the bar code label 14 to provide an alternative means of permanently encoding the unique identification number or it may be used in lieu of the bar code label 14.

A second microchip 40 may be optionally added to the bag 12 during manufacture at a location other than that of the first microchip 36 to aid in its scanning (i.e., reading of the unique identification number) by the microchip scanner 38.

The second microchip 40 must encode the same information (i.e., the same unique identification number) as the first microchip 36.

If desired, greater variety in positioning may be achieved by using a third microchip 42 and a fourth microchip 44 both of which also encode the same information as the first microchip 36 and which are also added to the bag 12 during manufacture.

The owner 24 registers the unique identification number (on the bar code label 14 or any of the microchips 36, 40–44) at the time of purchase or thereafter by any of a number of methods such as by filling out and mailing an owner registration card, registering through the airline upon check-in, by placing a telephone call to an operator, or via the Internet.

If owner 24 does not register the bag 12 with the central database, the bag bar code label 14 (or any of the microchips 36, 40–44) can still be utilized by the airline for tracking, handling and transporting the bag since the bag 12's unique code can be entered into the airline's Passenger Name Record for tracking in the airline system alone.

The information supplied by the owner 24 would include the name and address of the owner 24 as well as any other authorized users of the bag, for example, a spouse or a child. Additional information may also be provided, as is described in greater detail hereinafter.

The information supplied would be entered into a data base 46. The data base 46 would be managed by either a data base company or by any of the trade organizations currently in existence or as may be created as a result of the present disclosure.

The owner would be provided with (or they would pick) an owner PIN (personal identification number) that is part of an owner request 48 for access to the data base 46.

The owner request 48 is a communication with the data base 46 and it includes the unique identification number (i.e., from the bar code label 14) and the owner PIN. Together, access to an owner's file 50 for the bag 12 is accomplished. The contents of the file 50 are made available to the owner 24 in response to a successful owner request 48 communication.

Only the owner 24 can enter travel information into the file 24 because only the owner 24 will transmit to the data base 46 the owner's PIN.

The travel information that is entered into the file 50 by the owner 24 may indicate the dates of travel, the address where he will be staying at, what airline or carrier he will use, the dates he will be at each address, when he will return home, changes in his home address, changes in authorized users, what seats are preferred (i.e., window, aisle, or center), and any other information as may now or in the future be deemed useful or desirable to track and maintain.

The owner 24 will likely enter whatever information he wishes when his travel plans are finalized or if he prefers, he may provide his owner PIN to his travel agent, and the travel agent may enter this information to update the contents of the file 50 in the data base 46.

For example, the owner 24 may update the file 50 to show that he will be at a Hilton Hotel at a particular street address with a particular telephone number in a certain city from April 5th through April 10th. He may then travel on April 11th to another city and to a Marriot Hotel where he will stay through April 20th.

If he is traveling by an airline company 52 who happens to delay or temporarily lose the bag 12, upon the airline company 52 again finding or recovering the bag 12, the airline company 52 would place an authorized user request 54 to the data base 46.

In order for the airline company 52 to receive access to the owner's file 50, the user request 54 must include the unique identification number (of the bag 12) and a code number that identifies the airline company 52 as an authorized user. It is anticipated that an annual or more frequent fee would be paid by the airline company 52 to whatever structure manages the data base 46 and in return for the fee that they would receive the code.

It is important to rely upon whatever level of security is deemed appropriate so that only authorized users are able to access the file 50. This is because if a potential burglar were to access the file 50, knowing the dates the owner 24 would be away from home and details as to the address of the owner 24 could facilitate committing a crime and hurt the owner 24.

The contents of the file 50 are made available to the airline company 52 in response to their request. However, the airline company 50 is not permitted to change or affect any of the contents of the file 50. They can only access the information that is contained in the file 50.

If the date the bag 12 is recovered is April 8th, the airline company 52 would arrange for delivery of the bag 12 to the Hilton Hotel where it would be reunited with the owner 24.

If the date the bag 12 is recovered is April 13th, the airline company 52 would not arrange for delivery of the bag 12 to the Hilton Hotel but would instead arrange for it to be delivered to the Marriot Hotel, where the owner 24 was instead now staying. As can be well appreciated, optimum delivery of the bag 12 is accomplished by knowing where the owner 24 will be and when he will be there.

A hotel 56 may similarly be an authorized user and be provided with access to the file SO. Accordingly, the hotel 56 may be able to assist in delivering the bag 12 to the owner 24 if it should be delivered to the hotel 56 when the owner 24 is not staying there or if the owner 24 should happen to leave the bag 12 at the hotel 24 by mistake.

If the owner 24 has several bags (not shown) each one must be registered and include its own file. The airline 52 would of course access the appropriate file associated with any piece of luggage (i.e., any bag) that was lost or delayed.

There is also the possibility that the bag 12 may be loaned to a friend, for example. In that case the owner 24 must access the file 50 and modify it accordingly by listing the friend as an authorized user and by providing the home address and travel plans of the friend (so that it would be available in the data base 46).

Failure of the owner to update the file 50 with regard to the friend using the bag 12 does not necessarily preclude the use of the bag 12 by the friend. It may or may not. However, it would preclude any benefit being afforded by the traceable luggage bag and system 10 in that the travel plans of the friend would not be in the file 50.

The airline company 52 may charge an additional fee, for example a luggage handling fee, in this instance. Conversely, they may reduce the fare for those who comply with the traceable luggage bag and system 10 or they may provide other incentives, such as bonus travel miles (for frequent air travelers) or allow them to take an extra bag (not shown) with them.

It saves both time and money for the airline company 52 if the traceable luggage bag and system 10 is relied upon. It also benefits the traveler. Time alone will determine what incentives, if any, are needed first to encourage implementation of the system and second to maintain it.

While optimally the bar code label 14 or the first microchip 36 are installed by the manufacturer it is to be understood that many prior bags (not shown) will be unable to benefit from the traceable luggage bag and system 10.

Accordingly, a modified bar code label (not shown) or a modified microchip (not shown) may be offered, presumably as an after-market kit, to be permanently attached to prior types of bags so that they may be included in and fully benefit from the traceable luggage bag and system 10.

When any of the microchips 36, 40–44 are used (either with or without the bar code label 14) and the owner 24 checks in at the ticket counter or at the curbside drop off point, the microchips 36, 40–44 can be read (i.e., scanned) along with or instead of the bar code label 14 to obtain the unique identification number which is then electronically associated (i.e., linked) with the owner 24 who will be traveling to a destination.

Either way, this saves the airline, for example, from having to print and apply a self-adhesive label (not shown) and of having to generate or assign their own type of an identification number (not shown) and of having to associate that number with the owner 24. With the traceable luggage bag and system 10, there is also no possibility that an airline-generated number might conflict with any that might be generated or used by some other airline (because each one is unique).

Instead, during check-in, the unique identification that is obtained by scanning either the bar code label 14 or the microchips 36, 40–44 is automatically used to perform a lookup in the data base 46, as the airline would be authorized to do. Immediately then at check-in, the airline company is able to know who the person is (from the file of authorized users) and this information would be available electronically for the airline company to use as they desired.

For example, it could be used by the airline company to access their own computer system and related data base (not shown) so as to perform a search for the person who was checking in and to automatically confirm their reservation and issue a boarding pass. When only one authorized user exists, it would not even be necessary to ask the person who was checking in what his name was.

In some instances, it is even conceivable that the boarding pass could be eliminated entirely. For example if one item of luggage is used as a carry-on piece of luggage and if it also includes the traceable luggage bag and system 10, then that one item of luggage could also function as the boarding pass being itself scanned just prior to entering a jetway (i.e., an area that is traversed just prior to entering an airplane).

Not only would the airline save money by use of the traceable luggage bag and system 10, but security would also be improved.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A traceable luggage bag and system, comprising:
   (a) means for permanently identifying said luggage bag, said means for permanently identifying including a unique identification number that is permanently attached to said luggage bag;
   (b) a data base, said data base containing a file of information pertinent to said luggage bag; and
   (c) means for providing access to said file to a user and wherein said user includes an owner of said luggage bag and wherein said access to said file includes providing means for said owner to change at least a portion of the contents of said file.

2. The traceable luggage bag and system of claim 1 wherein said user is an authorized user.

3. The traceable luggage bag and system of claim 2 wherein said access to said file by said authorized user includes an ability to view the contents of said file and precludes an ability to change any of the contents of said file.

4. The traceable luggage bag and system of claim 2 wherein said authorized user includes an airline company.

5. The traceable luggage bag and system of claim 2 wherein said authorized user includes a commercial type of a carrier.

6. The traceable luggage bag and system of claim 2 wherein said authorized user includes a hotel.

7. The traceable luggage bag and system of claim 1 wherein said means for permanently identifying said luggage bag includes at least one bar code label that is permanently attached to said luggage bag.

8. The traceable luggage bag and system of claim 1 wherein said means for permanently identifying said luggage bag includes at least one microchip that is permanently attached to said luggage bag.

9. The traceable luggage bag and system of claim 1 wherein said means for permanently identifying said luggage bag is permanently attached to said luggage bag by a manufacturer at the time said luggage bag is manufactured.

10. The traceable luggage bag and system of claim 1 wherein said means for permanently identifying said luggage bag is permanently attached to said luggage bag after said luggage bag has been manufactured.

11. The traceable luggage bag and system of claim 1 wherein said means for providing access to said file is provided subsequent to a communication to said data base providing said unique identification number and an owner personal identification number to said data base and, wherein, said means for providing access includes means for changing the contents of said file.

12. The traceable luggage bag and system of claim 1 wherein said means for providing access to said file is provided subsequent to a communication to said data base providing said unique identification number and an authorized user identification number to said data base and, wherein, said means for providing access includes means for preventing said authorized user from changing the contents of said file.

13. A traceable luggage bag and system, comprising:
   (a) a luggage bag having a predetermined size and shape;
   (b) means for permanently identifying said luggage bag, said means for permanently identifying including a unique identification number that is permanently attached to said luggage bag;
   (c) a data base, said data base containing a file of information pertinent to said luggage bag and wherein said unique identification number provides access to said data base and wherein said access to said data base provides a linkage with an owner of said luggage bag; and
   (c) wherein said owner of said luggage bag is adapted to change at least a portion of the contents of said file and including at least one authorized user and wherein said authorized user is provided access to said unique identification number and wherein said unique identification number provides access for said authorized user to said data base and wherein said authorized user is permitted to view the contents of said file and is prevented from changing any of the contents of said file.

14. The traceable luggage bag and system of claim 13 including means for obtaining said unique identification number from said means for permanently identifying.

* * * * *

(12) EX PARTE REEXAMINATION CERTIFICATE (9400th)
United States Patent
Cartwright et al.

(10) Number: US 6,476,718 C1
(45) Certificate Issued: Nov. 6, 2012

(54) TRACEABLE LUGGAGE BAG AND SYSTEM

(76) Inventors: Christopher Leslie Mutlow Cartwright, San Rafael, CA (US); John Mutlow Cartwright, Sonoma, CA (US)

Reexamination Request:
No. 90/011,891, Sep. 30, 2011

Reexamination Certificate for:
| | |
|---|---|
| Patent No.: | 6,476,718 |
| Issued: | Nov. 5, 2002 |
| Appl. No.: | 09/591,932 |
| Filed: | Jun. 12, 2000 |

(51) Int. Cl.
*G06K 17/00* (2006.01)

(52) U.S. Cl. ............... 340/572.1; 340/568.1; 340/572.4; 340/572.7

(58) Field of Classification Search .................. None
See application file for complete search history.

(56) References Cited

To view the complete listing of prior art documents cited during the proceeding for Reexamination Control Number 90/011,891, please refer to the USPTO's public Patent Application Information Retrieval (PAIR) system under the Display References tab.

*Primary Examiner* — Adam Basehoar

(57) ABSTRACT

An apparatus for the unique and permanent identification of an article of luggage includes a microchip attached to the article of luggage. The microchip contains a unique identification number that uniquely identifies that particular article of luggage apart from all other articles of luggage. A data base is provided that includes a file appertaining to each article of luggage. The file includes the name and address of the owner of the article of luggage and is updated by the owner, as desired, to include his travel plans. Only the owner (or his representative) may change the contents of the file. Authorized users, such as airline companies, may view but not alter the contents of the file subsequent to a communication to the data base that includes the unique identification number and an authorized user identification number.

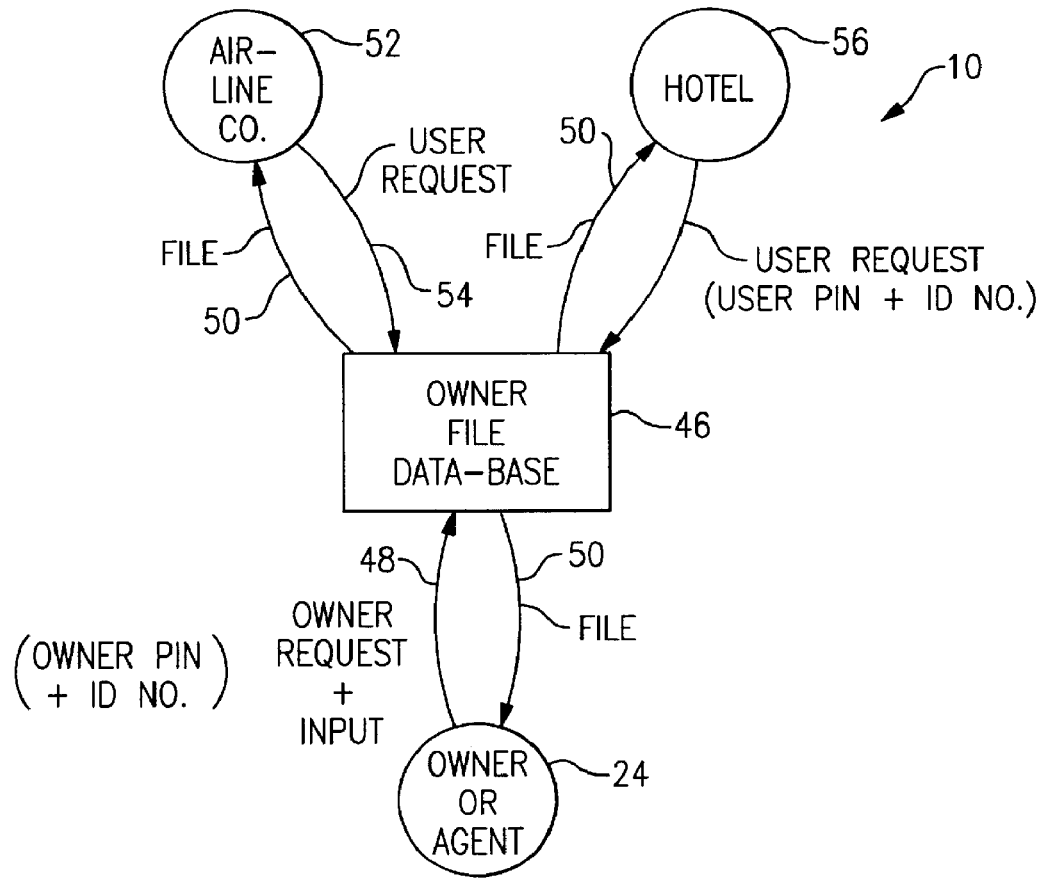

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 is cancelled.

Claims 1-3, 11, 13 and 14 are determined to be patentable as amended.

Claims 4-10, dependent on an amended claim, are determined to be patentable.

New claim 15 is added and determined to be patentable.

1. A traceable luggage bag and system, comprising:
   (a) means for permanently identifying said luggage bag, said means for permanently identifying including a unique identification number that is permanently attached to said luggage bag;
   (b) a data base, said data base containing a file of information pertinent to said luggage bag; and
   (c) means for providing access to said file to a user and wherein said user includes an owner of said luggage bag and wherein said access to said file includes providing means for said owner to change at least a portion of the contents of said file *and wherein said means for providing access to said file is provided subsequent to a communication to said data base providing said unique identification number and an owner personal identification number to said data base and, wherein, said means for providing access includes means for changing the contents of said file.*

2. The traceable luggage bag and system of claim 1 wherein said [user is an authorized user] *means for providing access to said file is also provided subsequent to a communication to said data base providing said unique identification number and an authorized user identification number to said data base and, wherein, said means for providing access includes means for preventing said authorized user from changing the contents of said file.*

3. The traceable luggage bag and system of [claim 2 wherein said access to said file by said authorized user includes an ability to view the contents of said file and precludes an ability to change any of the contents of said file] *claim 1 wherein said means for permanently identifying said luggage bag further comprises an embedded microchip.*

11. The traceable luggage bag and system of claim 1 wherein said [means for providing access to said file is provided subsequent to a communication to said data base providing said unique identification number and an owner personal identification number to said data base and, wherein, said means for providing access includes means for changing the contents of said file] *luggage bag comprises a hard-sided container.*

13. A traceable luggage bag and system, comprising:
   (a) a luggage bag container having a predetermined size and shape;
   (b) means for permanently identifying said luggage bag, said means for permanently identifying including a unique identification number that is permanently attached to said luggage bag;
   (c) a data base, said data base containing a file of information pertinent to said luggage bag and wherein said unique identification number provides access to said data base and wherein said access to said data base provides a linkage with an owner of said luggage bag; [and
   (c) wherein said owner of said luggage bag is adapted to change at least a portion of the contents of said file and including at least one authorized user and wherein said authorized user is provided access to said unique identification number and wherein said unique identification number provides access for said authorized user to said data base and wherein said authorized user is permitted to view the contents of said file and is prevented from changing any of the contents of said file]
   (*d*) *at least one authorized user and wherein said authorized user is provided access to said unique identification number and wherein said unique identification number provides access for said authorized user to said data base and wherein said authorized user is permitted to view the contents of said file and is prevented from changing the contents of said file; and*
   *wherein an owner of said luggage bag container is provided with access to said file wherein said access to said file includes providing means for said owner to change at least a portion of the contents of said file and wherein access to said file is provided subsequent to a communication to said data base providing said unique identification number and an owner personal identification number to said data base.*

14. The traceable luggage bag and system of claim 13 [including means for obtaining said unique identification number from said means for permanently identifying] *wherein access provided to said file is subsequent to a communication to said data base providing said unique identification number and an authorized user identification number to said data base and, wherein the authorized user is prevented from changing the contents of said file.*

*15. The traceable luggage bag and system of claim 11, wherein said hard sided container is for transporting guns singly or in bulk.*

* * * * *